US009476802B2

United States Patent
Sato

(10) Patent No.: US 9,476,802 B2
(45) Date of Patent: Oct. 25, 2016

(54) LOAD MEASUREMENT METHOD AND APPARATUS, RAILCAR PROVIDED WITH LOAD MEASUREMENT APPARATUS, AND LOAD MANAGEMENT SYSTEM

(71) Applicant: KAWASAKI JUKOGYO KABUSHIKI KAISHA, Kobe-shi, Hyogo (JP)

(72) Inventor: Yoshi Sato, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 14/426,834

(22) PCT Filed: Sep. 9, 2013

(86) PCT No.: PCT/JP2013/074243
§ 371 (c)(1),
(2) Date: Mar. 9, 2015

(87) PCT Pub. No.: WO2014/042123
PCT Pub. Date: Mar. 20, 2014

(65) Prior Publication Data
US 2015/0247782 A1 Sep. 3, 2015

(30) Foreign Application Priority Data

Sep. 11, 2012 (JP) ................................. 2012-199724

(51) Int. Cl.
*G01L 5/00* (2006.01)
*G01M 17/10* (2006.01)
(Continued)

(52) U.S. Cl.
CPC ................ *G01M 17/10* (2013.01); *B61K 9/02* (2013.01); *G01L 5/16* (2013.01); *G01L 5/18* (2013.01);
(Continued)

(58) Field of Classification Search
CPC ............ B61K 9/00; B61K 9/08; B61K 9/12; B61K 9/0208; B61F 5/06; B61F 5/50; G01L 5/12; G01L 5/20; G01L 5/0023; G01L 5/0009; G01L 5/16; G01L 5/18
USPC ............... 73/146, 862.041–862.044, 862.69, 73/862.381; 33/203.18, 523.1, 651; 105/168
See application file for complete search history.

(56) References Cited

U.S. PATENT DOCUMENTS 3,718,040 A   2/1973  Freeman et al.
4,505,457 A * 3/1985  Okada .................. B61F 5/50
                                         105/197.05
(Continued)

FOREIGN PATENT DOCUMENTS

CN    2613752 Y    4/2004
JP    4836801 A    5/1973
(Continued)

OTHER PUBLICATIONS

Takehashi et al. "Load Estimation of Axle-box Rolling Bearings from Wheel Loads and Lateral Forces". RTRI Report vol. 25, No. 1, Jan. 2011. Accessed Online <http://bunken.rtri.or.jp/PDF/cdroms1/0001/2011/0001003406.pdf>.*
(Continued)

Primary Examiner — Lisa Caputo
Assistant Examiner — Jonathan Dunlap
(74) Attorney, Agent, or Firm — Oliff PLC

(57) ABSTRACT

A load measurement method, for measuring the load applied to a rail from a wheel of a railcar, calculates the lateral force applied to the rail from each of the left and right wheels, on the basis of the axial force applied to an axle between the left and right wheels and the axial load applied to the axle bearing.

9 Claims, 9 Drawing Sheets

(51) Int. Cl.
  *B61K 9/02* (2006.01)
  *G01L 5/16* (2006.01)
  *G01L 5/18* (2006.01)
  *G01L 5/20* (2006.01)
  *B61K 9/12* (2006.01)
  *B61K 9/00* (2006.01)
  *B61K 9/08* (2006.01)
  *G01L 5/12* (2006.01)

(52) U.S. Cl.
  CPC .. *B61K 9/00* (2013.01); *B61K 9/08* (2013.01); *B61K 9/12* (2013.01); *G01L 5/0023* (2013.01); *G01L 5/12* (2013.01); *G01L 5/20* (2013.01)

(56) References Cited

U.S. PATENT DOCUMENTS

| | | | | |
|---|---|---|---|---|
| 5,083,513 | A * | 1/1992 | Kobayashi | B61F 5/38 105/168 |
| 5,199,176 | A * | 4/1993 | Theurer | B61K 9/08 33/1 Q |
| 5,213,049 | A * | 5/1993 | Kobayashi | B61F 5/44 105/168 |
| 5,492,002 | A * | 2/1996 | Higgins | G01M 17/10 73/1.14 |
| 5,596,203 | A * | 1/1997 | Zingarelli | B61F 5/50 250/559.29 |
| 5,775,230 | A | 7/1998 | Joos | |
| 6,546,790 | B1 * | 4/2003 | Halliday | G01L 5/12 73/146 |
| 6,668,239 | B1 * | 12/2003 | Gilbert | B61K 9/08 34/342 |
| 6,725,782 | B1 | 4/2004 | Bloom et al. | |
| 7,007,561 | B1 * | 3/2006 | Otto | B61K 9/08 73/862.631 |
| 7,081,824 | B2 * | 7/2006 | Gilbert | B61K 9/08 33/285 |
| 7,254,896 | B2 * | 8/2007 | Carr | E01B 35/04 295/36.1 |
| 7,688,218 | B2 * | 3/2010 | LeFebvre | B61K 9/00 246/169 R |
| 8,227,713 | B1 | 7/2012 | Slifkin et al. | |
| 2004/0173033 | A1 * | 9/2004 | Gilbert | B61K 9/08 73/862 |
| 2007/0143039 | A1 | 6/2007 | Mol | |
| 2007/0152107 | A1 * | 7/2007 | LeFebvre | B61K 9/00 246/169 R |
| 2008/0144985 | A1 * | 6/2008 | Joki | B60B 3/04 384/448 |
| 2009/0229379 | A1 * | 9/2009 | Ozaki | B60B 27/0005 73/862.69 |
| 2010/0154672 | A1 * | 6/2010 | Forbes | B61F 5/32 105/168 |
| 2013/0233066 | A1 * | 9/2013 | Wakazono | G01M 17/021 73/146 |

FOREIGN PATENT DOCUMENTS

| | | | |
|---|---|---|---|
| JP | 2003344202 A | | 12/2003 |
| JP | 2004045219 A | * | 2/2004 |
| JP | 2004161115 A | | 6/2004 |
| JP | 2004209995 A | | 7/2004 |
| JP | 2004219160 A | | 8/2004 |
| JP | 2004219161 A | | 8/2004 |
| JP | 2005003375 A | | 1/2005 |
| JP | 2005204462 A | | 7/2005 |
| JP | 2006088967 A | | 4/2006 |
| JP | 2007024663 A | | 2/2007 |
| JP | 2008201389 A | | 9/2008 |
| JP | 2008297845 A | | 12/2008 |
| JP | 2009210437 A | | 9/2009 |

OTHER PUBLICATIONS

Tanaka et al. "The estimation of wheel load and lateral force using the axlebox acceleration". 8$^{th}$ World Congress on Railway Research, May 18-22, 2008. Accessed Online <http://www.uic.org/cdrom/2008/11_wcrr2008/pdf/I.2.1.1.2.pdf>.*

Nov. 19, 2013 International Search Report issued in International Application No. PCT/JP2013/074243.

Nov. 17, 2015 Search Report and Written Opinion issued in Singapore Patent Application No. 11201501755W.

* cited by examiner

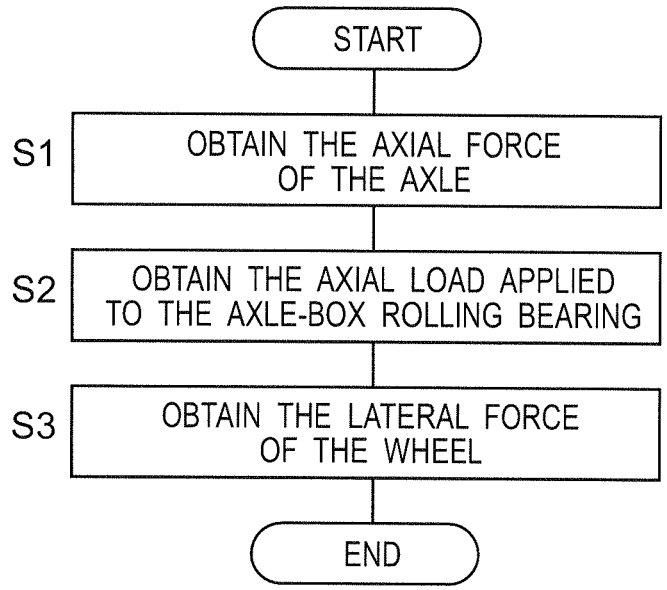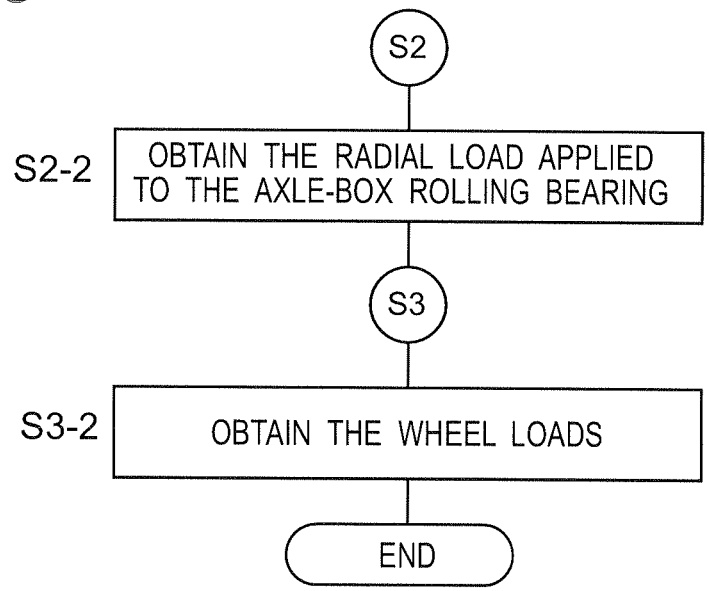

AXIAL FORCE DATA OF THE AXLE
(TRANSMITTED WITH RADIO WAVE)

LOAD MEASUREMENT METHOD AND APPARATUS, RAILCAR PROVIDED WITH LOAD MEASUREMENT APPARATUS, AND LOAD MANAGEMENT SYSTEM

TECHNICAL FIELD

The present invention relates to methods and apparatus for measuring a load between a wheel of a railcar and a rail, a railcar including the load measurement apparatus, and a load management system.

BACKGROUND ART

When new railcars are manufactured, and when a new line is constructed, their safety has to be verified. In addition, since a friction coefficient between a wheel and a rail, and a state of a track are changing with time, a state of a force applied between the wheel and rail changes over time after the new railcars are manufactured or when the new line is opened.

Therefore, the safety has to be verified even in commercial lines.

Examples of running safety evaluating methods for the railcar include a method using a derailment coefficient. The derailment coefficient is a value represented by Q/P, wherein Q is a horizontal force applied between a wheel and a rail, i.e., a lateral force in the direction along an axle, and P is a wheel load that is a vertical force applied between the wheel and the rail. The derailment coefficient becomes one index for evaluating the running safety of the railcar, as indicated by this equation, so that the wheel load (P) and the lateral force (Q) are measured.

PRIOR ART DOCUMENT

Patent Document

Patent Document 1: Japanese Patent Laid-open Publication No. JP 2006-88967

SUMMARY OF THE INVENTION

Problems to be Solved by the Invention

On the other hand, a PQ monitoring wheelset, which is a special wheelset formed by attaching a special strain gauge to a wheel, has conventionally been required to measure the wheel load and the lateral force. The manufacture of the PQ wheelset and the measurement of the wheel load and the lateral force by the PQ wheelset are not easy, and much cost is needed for the manufacture of the PQ wheelset and an inspection of the wheel load and the lateral force by the PQ wheelset. In addition, factors such as a heat generated by a tread brake affect the measured value of the wheel load and the lateral force. When a disc brake is employed, the attachment of the special strain gauge is difficult, resulting in that the measurement in itself becomes difficult. Even if the measurement may be performed, due to the measured value having hysteresis, so that the wheel load and the lateral force cannot accurately be obtained.

The technique described in Patent Document 1 adopts a configuration in which a non-contact displacement gauge is mounted opposite to a rim of a wheel. Due to the configuration, the technique facilitates a measurement and can enhance reliability in the-measurement. However, this technique needs to form a whole circumference of the rim to be smooth. In addition, this technique has to use a very expensive non-contact displacement gauge, since a minute value has to be measured. Therefore, this technique still has problems in the manufacture and cost.

To solve the above problems, and it is an object of the present invention to provide methods and apparatus for measuring a load applied to a rail from a wheel, the methods and apparatus enabling an easy measurement, ensuring reliability in the measurement, and being more excellent in manufacture and cost than conventional ones; a railcar provided with the load measurement apparatus; and a load management system.

Solutions to the Problems

In order to achieve the object, the present invention is configured as described below.

Specifically, according to a first aspect of the present invention, there is provided a load measurement method for measuring loads applied to rails from a pair of wheels of a railcar which includes the wheels, an axle supporting the wheels and a pair of bearings supporting the axle to be rotatable, the method comprising:

measuring axial loads applied to the respective bearings;

measuring an axial force applied to the axle in an longitudinal direction; and obtaining lateral forces applied to rails from the respective wheels by using the measured axial loads and the measured axial force.

According to a second aspect of the present invention, there is provided a load measurement apparatus for measuring loads applied to rails from a pair of wheels of a railcar which includes the wheels, an axle supporting the wheels and a pair of bearings supporting the axle to be rotatable, the apparatus comprising:

an axial load measurement unit configured to measure each of axial loads applied to the respective bearings;

an axial force measurement unit configured to measure an axial force applied to the axle in an longitudinal direction; and a processor configured to obtain each of lateral forces applied to the rails from the wheels by using the measured axial loads and the axial force.

According to the load measurement method and apparatus described above, each of lateral forces applied to the rail from each of the right and left wheels can be obtained by using the axial force and axial loads applied to an axle in a wheelset in a longitudinal direction. The axial force and the axial loads can be measured by using a normal wheelset with common measuring equipments. Therefore, a special wheelset such as the PQ wheelset and a special measuring instrument are not needed. Accordingly, cost can significantly be reduced, and further, a time for an extra running test is not needed for the measurement. Even when a tread brake is operated, the operation of the tread brake does not affect the measurement. Therefore, a stable measurement is enabled, and even if an advanced center-fastened disk brake is provided, the lateral force can be measured.

As described above, according to the load measurement method in the first aspect and the load measurement apparatus in the second aspect, a load measurement apparatus that enables an easy measurement, ensures reliability in the measurement, and is more excellent in manufacture and cost than conventional ones can be provided.

A railcar according to a third aspect of the present invention is characterized by including the load measurement apparatus according to the second aspect.

According to a fourth aspect of the present invention, there is provided a load management system configured to manage loads applied to rails from a pair of wheels of a railcar including the wheels, an axle supporting the wheels, and a pair of bearings supporting the axle to be rotatable, the system comprising:

an axial load measurement unit configured to measure each of axial loads applied to the respective bearings;

an axial force measurement unit configured to measure an axial force applied to the axle in an longitudinal direction;

a processor configured to obtain each of lateral forces applied to the rails from the wheels by using the measured axial loads and the axial force;

a storage unit configured to store lateral force information indicating the lateral forces obtained by the processor, and at least one of time information, track information and traffic data, which correspond to the obtained lateral force; and an analyzing unit configured to obtain a change over time of the lateral force information based on each of the information pieces stored in the storage unit.

Effects of the Invention

The present invention can provide a load measurement method and apparatus for measuring a load applied to a rail from a wheel, the method and apparatus enabling an easy measurement, ensuring reliability in the measurement, and being more excellent in manufacture and cost than conventional ones; a railcar provided with the load measurement apparatus; and a load management system.

BRIEF DESCRIPTION OF THE DRAWINGS

FIG. 1 is a flowchart illustrating an operation in a load measurement method according to a first embodiment.

FIG. 2 is a flowchart illustrating an operation further using a radial load in the load measurement method in FIG. 1.

EMBODIMENTS OF THE INVENTION

Figure 3:
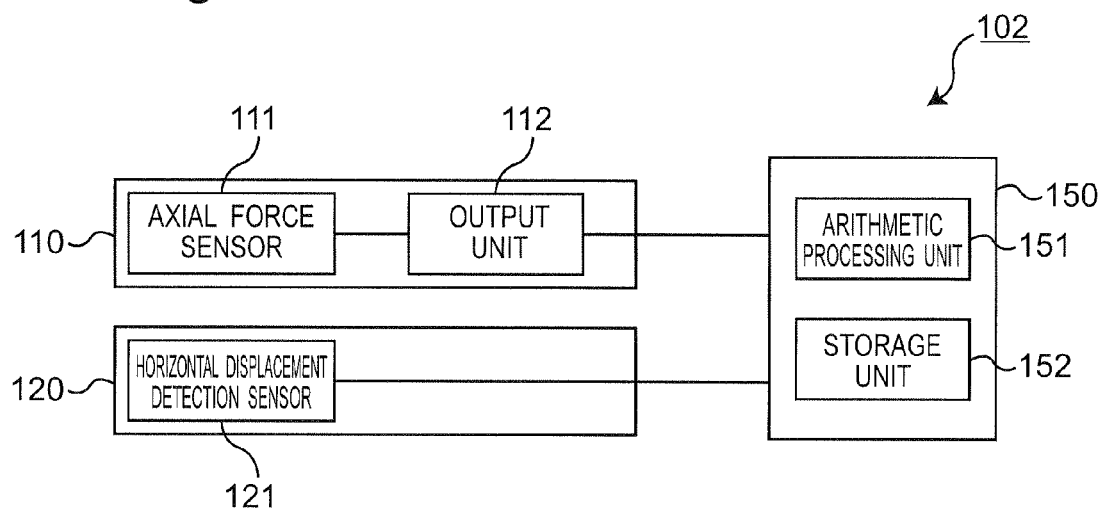
FIG. 3 is a block diagram illustrating a configuration of a load measurement apparatus according to the second embodiment.

A load measurement method and apparatus for measuring a load applied to a rail from a wheel of a railcar, a railcar including the load measurement apparatus, and a load management system provided with the railcar according to embodiments will be described below with reference to the drawings. In each figure, the same or similar components are identified by the same reference numerals.

First Embodiment

A basic idea of the load measurement method according to the first embodiment will firstly be described.

As described in the above Patent Document, a method of measuring a wheel load and a lateral force of a wheel of a railcar has been proposed, and further, an article describing that a load applied to bearings of axle-boxes of a wheelset is estimated by utilizing measured wheel loads and lateral forces has been reported (Takahashi et al, "Load estimation of bearings of axle-boxes from wheel loads and lateral forces", RTRI report, vol. 25, No. 1, January, 2011). This article shows a relationship between both wheel loads and lateral forces and both radial loads and axial loads applied to the bearings of axle-boxes with an equation, and describes that the radial loads and the axial loads applied to the bearings of axle-boxes can be calculated from wheel load values and lateral force values.

From the disclosed relation expression, a wheel load value and a lateral force value can be calculated by measuring a radial load and an axial load applied to a bearing of an axle-box. Actually, the wheel load value of each of right and left wheels can be obtained by an inverse transformation of the disclosed expression.

On the other hand, as for the lateral force value, as is apparent from the expressions (6) and (7) in the article of the RTRI report, only a total value of the lateral forces applied to the right and left wheels can be obtained even if an inverse transformation is performed.

This can easily be understood from a reason that forces applied to an exterior of a wheelset cannot be measured by any methods, since the lateral forces (Q) applied to the right and left wheels are an internal force in the wheelset.

The detail of the load measurement method according to the present embodiment will be described below. FIG. 1 is a flowchart illustrating the load measurement method, and FIG. 2 is a flowchart illustrating the load measurement method using a radial load.

Figure 14:
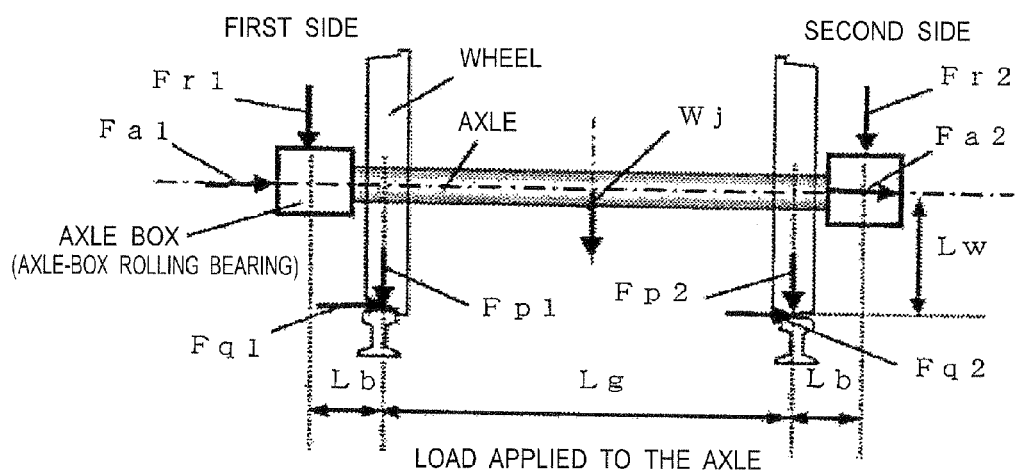
FIG. 14 corresponds to FIG. 3 in Railway Technical Research Institute (RTRI) Report, Vol. 25, No. 1, January, 2011.

FIG. 14 corresponds to FIG. 3 in the above article of the RTRI report, and the explanation for each of reference numerals in FIG. 14 is as stated in the above article. Specifically, FIG. 14 illustrates each load applied to a wheelset of a running railcar, wherein "Fr" is a vertical load applied to a bearing of an axle-box from a truck frame and corresponds to a radial load of an axle-box, "Fa" is a load applied to the bearing from the truck frame in the crosswise direction, and corresponds to an axial load of the axle-box, "Fp" is a reaction force of a wheel load applied to a wheel from a rail, "Fq" is a reaction force of a lateral force applied to the wheel from the rail, and "Wj" is gravity force applied to the wheelset, which is unsprung mass per one wheelset. Indexes 1 and 2 respectively indicate a first side and a second side. A direction from top to bottom in the figure is defined as positive, and a direction from left to right (from the first side to the second side) is defined as positive, all forces in the figure are indicated by arrows in the positive direction. Further "Lg" is a space between contact points of each wheel and the rail, "Lb" is a distance between the contact point of each wheel and the rail and the center of the bearing of axle-box, and "Lw" is a radius of each wheel.

The expressions (6) and (7) in the article of the RTRI report, and expressions (3) and (5) are stated below.

$$Fa1+Fa2=-(Fq1+Fq2) \quad \text{Expression (6)}$$

$$Fa1=Fa2=-(½)\cdot(Fq1+Fq2) \quad \text{Expression (7)}$$

$$Fr1+Fr2+Wj+Fp1+Fp2=0 \quad \text{Expression (3)}$$

$$-Lb\cdot Fr1+(Lg+Lb)Fr2+Lw(Fa1+Fa2)+(½)\cdot Lg\cdot Wj+Lg\cdot Fp2=0 \quad \text{Expression (5)}$$

$Fa1+Fq1=-(Fa2+Fq2)$ is obtained by modifying the expression (6) in the article of the RTRI report. Specifically, it can be understood that the resultant force $Fa1+Fq1$ of a set of the left wheel and the left bearing of axle-box in the wheelset and the resultant force $Fa2+Fq2$ of a set of the right wheel and the right bearing of axle-box in the wheelset are balanced through the axle. That is, the minus sign ("−") indicates a direction of force with respect to the center of the axle.

On the other hand, the resultant force $Fa1+Fq1$ at the left side and the resultant force $Fa2+Fq2$ at the right side are forces along the longitudinal direction of the axle (the above-mentioned crosswise direction). From this, $Fa1+Fq1$ and $Fa2+Fq2$ are balanced by the force in the longitudinal direction (axial force) applied to the axle.

Specifically, when the force in the longitudinal direction (axial force) applied to the axle is defined as $Fa3$, $$Fa1+Fq1=Fa3$$

$$Fa2+Fq2=Fa3$$

Therefore, lateral forces Fq1 and Fq2 applied to the rail from each wheel can be calculated from the expression "A" described below.

$$Fq1=Fa3-Fa1, Fq2=Fa3-Fa2 \quad \text{Expression "A"}$$

Accordingly, when the force Fa3 in the longitudinal direction, i.e., the axial force, applied to the axle is found, Fq1 and Fq2 can be individually obtained. Thus, a lateral force applied to the rail from each of the right and left wheels can be obtained.

As described above, according to the load measurement method of the present embodiment, the lateral force applied to the rail from each of the right and left wheels can be separately obtained by using a measured or known axial load applied to the bearing of axle-box and a measured or known axial force applied to the axle in the longitudinal direction.

Practically, not only the axial force but also bending stress is applied to the axle. Therefore, a component of the bending stress has to be canceled in order to obtain the axial force. This will be described later.

After the lateral forces Fq1 and Fq2 are obtained, the wheel loads Fp1 and Fp2 can be obtained by back calculation with the expression "B" described below by using the radial loads Fr1 and Fr2 applied to each bearing of axle-box.

$$Fp2=(Lb/Lg)Fr1-\{(Lg+Lb)/Lg\}Fr2-\{(Lw/Lg)(Fa1+Fa2)\}-(½)Wj$$

$$Fp1=-(Fr1+Fr2+Wj+Fp2) \quad \text{Expression "B"}$$

From the above calculation expressions, the lateral force of each wheel can be obtained based on the flowchart illustrated in FIG. 1, for example. Specifically, in step S1, the axial force Fa3 of the axle is obtained by using the expression "A", and then, in step S2, the axial loads Fa1 and Fa2 applied to the bearings of axle-boxes rolling are obtained. Finally, in step S3, the lateral forces Fq1 and Fq2 of the respective wheels are obtained from the axial force Fa3 and the axial loads Fa1 and Fa2.

As described above, the axial force applied to the axle and the axial loads may be obtained through measurement, or may be known values. The above steps S1 and S2 in FIG. 1 are illustrated in the order of S1 and S2 for convenience of illustration, and the order thereof may be reversed, or these steps may simultaneously be performed.

In addition, a wheel load of each wheel can be obtained based on the flowchart illustrated in FIG. 2 from the above calculation expressions, for example. Specifically, in step S2-2, the radial loads Fr1 and Fr2 applied to the bearings of axle-boxes are obtained, and in step S3-2, each wheel load Fp1 and Fp2 can be obtained by using the expression "B".

Here, the radial loads may be obtained through measurement, or may be known values. As in FIG. 1, the steps S1, S2, and S2-2 may be performed in random order or simultaneously. The steps S3 and S3-2 may also be performed in random order or simultaneously.

Derailment coefficients Fq1/Fp1 and Fq2/Fp2 can be obtained from the lateral force values and wheel load values obtained as described above.

The lateral forces and wheel loads obtained according to the above load measurement method may be obtained from a computing apparatus, or by calculation carried out by a person.

Second Embodiment

A load measurement apparatus that can perform the above load measurement method will be described with reference to FIGS. 3, and 5 to 7.

FIG. 3 illustrates a schematic configuration of a load measurement apparatus 102 that can perform the load measurement method illustrated in FIG. 1. The load measurement apparatus 102 includes an axial force measurement unit 110, an axial load measurement unit 120, and a processor 150.

The axial force measurement unit 110 is an apparatus for measuring a force (axial force) applied to an axle 13 between right and left wheels in a longitudinal direction (crosswise direction) 13a, and includes an axial force sensor 111 and an output unit 112.

Figure 5:
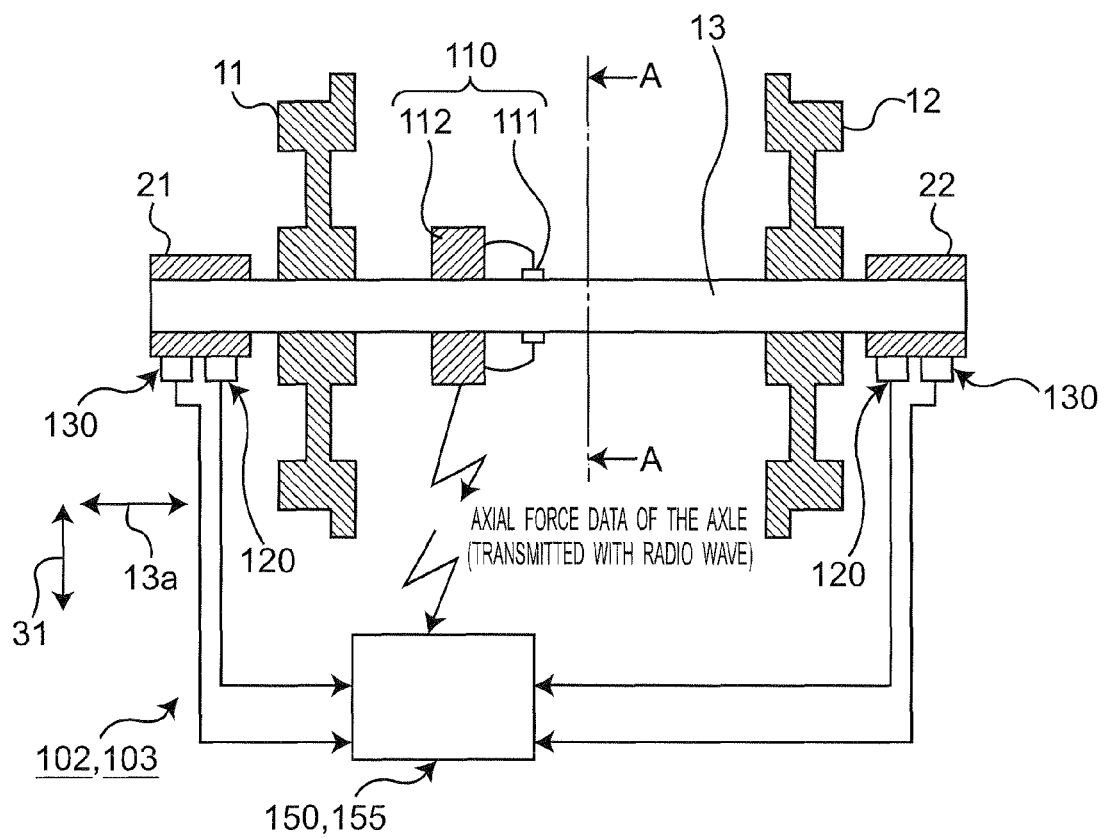
FIG. 5 is a view illustrating a state in which the load measurement apparatus according to the second and third embodiments is mounted to a wheelset.
Figure 6:
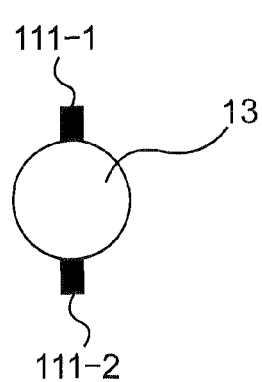
FIG. 6 is a sectional view of an A-A portion in FIG. 5, illustrating a position where an axial force sensor is mounted on an axle.

The axial force sensor 111, which may, for example, be a strain gauge, can detect deformation of the axle 13. As illustrated in FIGS. 5 and 6, the axial force sensor 111 can be provided such that a pair of sensors is mounted on two opposite positions on the peripheral surface of the axle 13 at one portion of the axle 13 in the longitudinal direction 13a between the left and right wheels 11 and 12. Specifically, a strain gauge is used as the axial force sensor 111, for example. A first strain gauge, i.e., an axial force sensor 111-1 is attached onto one portion of the axle 13 in the longitudinal direction 13a. Further, a second strain gauge, i.e., an axial force sensor 111-2 is attached onto a position at 180 degrees from the sensor 111-1 in the circumferential direction of the axle. The position is in the same cross-section of the axle as that for the first strain gauge in the longitudinal direction 13a, and corresponds to the symmetric position with respect to the center of the cross-section between the first and second strain gauges.

The output unit 112 can be fixed to the axle 13, and is configured by using a telemeter, for example. The output unit 112 is connected to respective axial force sensors 111 with lead wires to wirelessly transmit output data from each axial force sensor 111 to the processor 150.

The axial load measurement unit 120 is an apparatus for measuring an axial load applied to each of left and right bearings of axle-boxes 21 and 22 (FIG. 5) in the longitudinal direction 13a of the axle 13. The axial load measurement unit 120 includes a horizontal displacement detection sensor 121. In FIG. 5, respective axial load measurement units 120 are provided to the bearings of axle-boxes 21 and 22. FIG. 5 is shared with a third embodiment described below as well as the second embodiment. Therefore, a configuration excluding a radial load measurement unit 130 from FIG. 5 corresponds to the configuration of the second embodiment.

Figure 7:
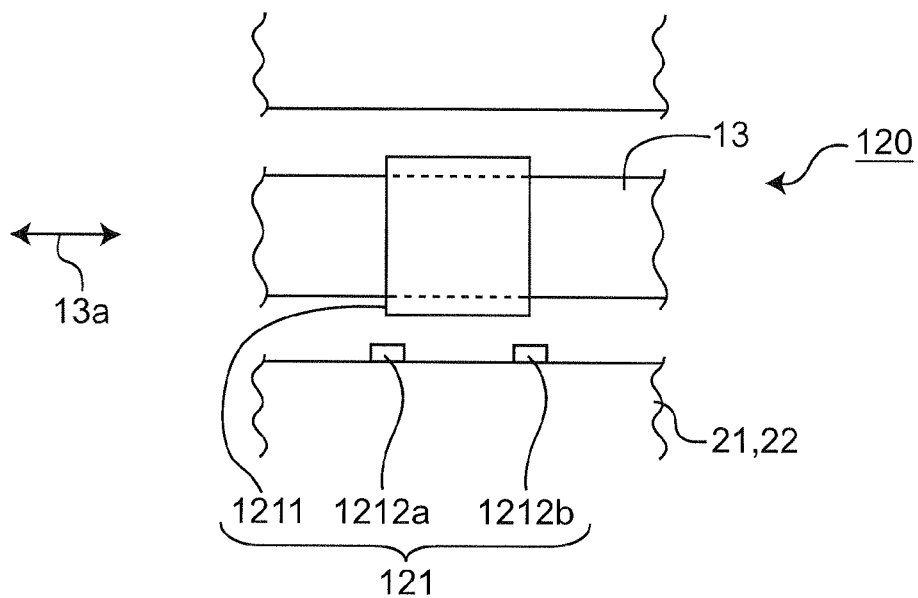
FIG. 7 is a view illustrating an example of a configuration of a horizontal displacement detection sensor in the load measurement apparatus according to the second and third embodiments.

Any known structures can be used for the horizontal displacement detection sensor 121. Here, as illustrated in FIG. 7, the horizontal displacement detection sensor 121 has an encoder 1211 made of a permanent magnet and a pair of sensors 1212a and 1212b. Generally stated, at each of the bearings of axle-boxes 21 and 22, the encoder 1211 annularly extends over the entire circumference of the axle 13, and rotates with the axle 13 about the axis of the axle. The pair of sensors 1212a and 1212b are arranged side by side along the longitudinal direction 13a so as to be opposite to the encoder 1211, and fixed to the bearings of axle-boxes 21 and 22 respectively. Each of the sensors 1212a and 1212b is connected to the processor 150.

The processor 150 is wirelessly connected to the axial force measurement unit 110 as described above, and is connected to the axial load measurement units 120 with the lead wires. The processor 150 is mounted to a carbody. The processor 150 determines each of lateral forces applied to rails from the pair of wheels 11 and 12 by using the axial force and the axial loads. The processor 150 includes an arithmetic processing unit 151 and a storage unit 152.

The arithmetic processing unit 151 in the processor 150 obtains the axial force and the axial loads, and further obtains the lateral forces.

Specifically, the arithmetic processing unit 151 obtains the axial force in the longitudinal direction 13a by canceling the component of bending stress applied to the axle 13 from a pair of strain data of the axle 13, which data are output data of the axial force sensors 111-1 and 111-2 supplied from the axial force measurement unit 110.

More specifically described, one strain gauge mounted on the circumference of the axle 13 outputs a value including "strain caused by the axial force" and "strain caused by bending moment of the axle 13". On the other hand, the axle 13 is bent in the vertical direction. Therefore, as explained above when a pair of strain gauges is attached at the opposite positions of the circumference of the same cross-section in the diameter direction and two strain gauges are connected in series, the arithmetic processing unit 151 can offset the strain caused by the bending moment of the axle 13 by using outputs from the respective strain gauges. Specifically, the output of the "strain caused by the bending moment" of the axle 13 is a sine wave of a rotational frequency of the axle 13. Therefore, the pair of strain gauges attached to the opposite positions in the diameter direction outputs sine waves with the same frequency, same amplitude, and inverse phase. The component of the "strain caused by the bending moment" can be canceled by adding these sine waves.

Alternatively, a pair of strain gauges is attached at the opposite positions in the diameter direction, but these strain gauges may not be connected in series. In this configuration, the arithmetic processing unit 151 may receive output data from each gauge and digitally perform a data processing for canceling the "strain caused by the bending moment".

As for the axial loads, a difference between output signals of the pair of sensors 1212a and 1212b is obtained, and the axial loads on the bearings of axle-boxes 21 and 22 are obtained from relationship between an amount of change in the difference and the level of the axial load. The relationship between the amount of change in the difference and the level of the axial load is obtained from measured data, which are measured beforehand, or through an operation.

The arithmetic processing unit 151 then obtains each of the lateral forces applied to the rail from each of the wheels 11 and 12 by using the obtained axial force and the axial loads with the expression "A" mentioned above.

The arithmetic processing unit 151 described above is actually realized by using a computer, and it is composed of software corresponding to the above operation and function, and hardware such as a CPU (central processing unit) and a memory for executing the operation and function. Therefore, each of the lateral force values is obtained from the axial force and the axial loads through calculation or according to a program by the arithmetic processing unit 151.

The storage unit 152 stores each lateral force value obtained as described above by the arithmetic processing unit 151, together with time information, track information, and traffic data. Therefore, each lateral force value can always be stored not only upon an inspection but also a commercial running.

According to the load measurement apparatus 102 as described above, the lateral forces applied to the rails from the left and right wheels 11 and 12 can individually be detected. The load measurement apparatus 102 can provide easy measurement, ensure reliability in the measurement, and is more excellent in manufacture and cost than conventional ones. Especially, a so-called PQ monitoring wheelset that has the special strain gauge attached to the wheel and has conventionally been used is not necessarily used, and the common measurement equipment can be used. Accordingly, 1. the load measurement apparatus provides easy measurement and can significantly reduce cost for measuring the lateral forces; 2. even when the tread brake is operated, the operation of the tread brake does not affect the measurement, and therefore, a stable measurement is enabled; 3. the lateral forces can be measured by using a wheelset in a general commercial passenger train car, so that a time for the running test can significantly be reduced; and 4. the lateral forces can be measured even if the disk brake (e.g., center-fastened disk brake) is installed.

The present embodiment employs the configuration in which the axial load measurement unit 120 is mounted to each of the left and right bearings of axle-boxes 21 and 22 as illustrated in FIG. 5. However, the embodiment is not limited to this configuration. Specifically, when the axial load values of both axial load measurement units 120 are found to be the same, the axial load measurement unit 120 may be provided to either one of the right and left bearings of axle-boxes.

Third Embodiment

The load measurement apparatus 102 according to the second embodiment includes the axial force measurement unit 110 and the axial load measurement unit 120, and obtains only the lateral forces of the left and right wheels 11 and 12. On the other hand, as stated previously, a load measurement apparatus according to the third embodiment further obtains a radial load to obtain not only the lateral forces but also wheel loads of the wheels 11 and 12.

Figure 4:
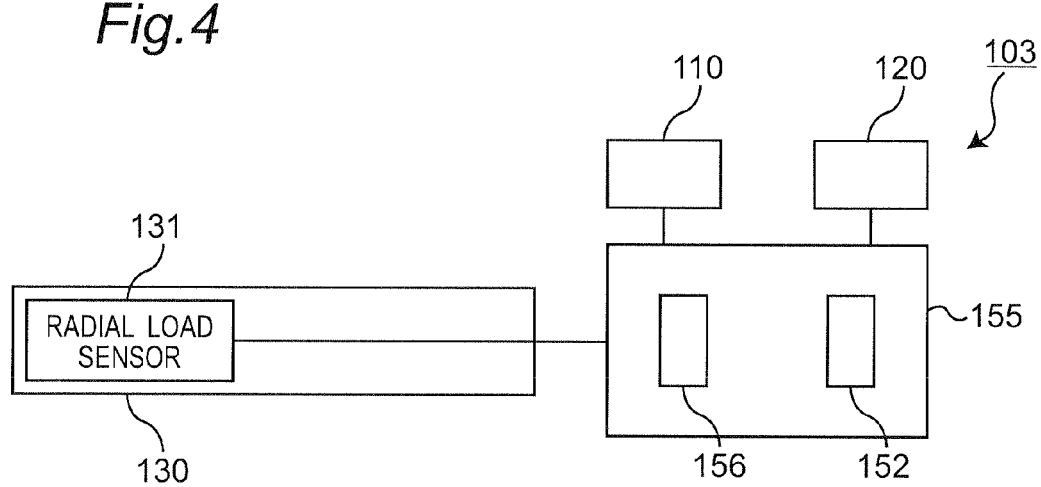
FIG. 4 is a block diagram illustrating a configuration of a load measurement apparatus according to a third embodiment.
Figure 8:
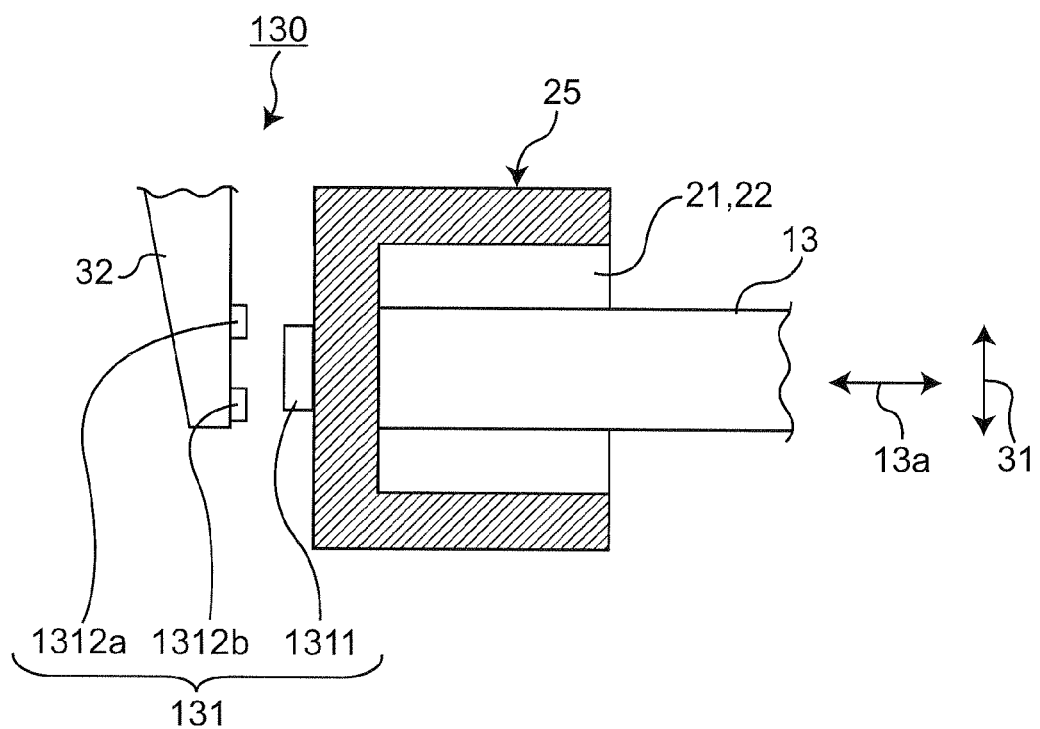
FIG. 8 is a view illustrating an example of a configuration of a radial load sensor in the load measurement apparatus according to the third embodiment.

Specifically, as illustrated in FIGS. 4, 5, and 8, a load measurement apparatus 103 according to the third embodiment further includes a radial load measurement unit 130 with respect to the configuration of the load measurement apparatus 102 according to the second embodiment. Therefore, the radial load measurement unit 130 will mainly be described below.

Since the radial load measurement unit 130 is further provided, a processor 155 is used in the load measurement apparatus 103 according to the third embodiment instead of the above explained processor 150. The processor 155 includes an arithmetic processing unit 156 and a storage unit 152, and obtains respective lateral forces and respective wheel loads applied to rails from the left and right wheels 11 and 12 by using the radial loads as well as the above-mentioned axial force and the axial loads.

The radial load measurement unit 130 is an apparatus for measuring the radial load applied to each of the bearings of axle-boxes 21 and 22 (FIG. 5) in the vertical direction 31 of the axle 13, i.e., in the direction of gravitational force that is at right angles to the longitudinal direction 13a. The radial load measurement unit 130 includes a radial load sensor 131. In FIG. 5, the radial load measurement unit 130 is mounted to each of the bearings of axle-boxes 21 and 22.

Any known structure can be used for the radial load sensor 131. Here, as illustrated in FIG. 8, the radial load sensor 131 has a permanent magnet 1311 and a pair of sensors 1312a and 1312b. Generally stated, the permanent magnet 1311 is attached onto an outer surface of each of axle boxes 25 including the bearings of axle-boxes 21 and 22 respectively. The pair of sensors 1312a and 1312b is arranged side by side along the vertical direction 31 so as to be opposite to the permanent magnet 1311, and they are fixed to a support member 32 that is stationary to the axle box 25.

The processor 155, especially the arithmetic processing unit 156, in the load measurement apparatus 103 thus configured performs operation described below.

Like the processor 150 described above, the arithmetic processing unit 156 obtains respective lateral forces of the wheels 11 and 12 by using the axial force and the axial loads.

Further, as to the radial load, the arithmetic processing unit 156 obtains a difference between output signals of the pair of sensors 1312a and 1312b, and then obtains the radial loads on the bearings of axle-boxes 21 and 22 by using a relationship between an amount of change in the above difference and the level of the radial load. The relationship between the amount of change in the difference and the level of the radial load is obtained by using measured data, which are measured beforehand, or through an operation.

The arithmetic processing unit 156 then obtains the respective wheel loads of the wheels 11 and 12 by using the above expression "B" based on each of the obtained lateral forces and radial loads. Values necessary for obtaining the wheel load in the expression "B", such as a value of the distance "Lb" between the contact point of the wheel and the rail and the center of the axle-box rolling bearing, and a value of "Lg" that is a space between contact points of each wheel and the rail, are inputted beforehand into the arithmetic processing unit 156.

The processor 155 obtains the lateral forces (Q) and the wheel loads (P) of the wheels 11 and 12 respectively. Thus, the processor 155 may further calculate a derailment coefficient (Q/P) based on Q and P.

The lateral forces, the wheel loads, and the derailment coefficient are always stored into the storage unit 152 in the processor 155 not only upon an inspection but also a commercial running.

Like the load measurement apparatus 102, the above-described load measurement apparatus 103 can provide effects such that the load measurement apparatus 103 provides easy measurement, ensures reliability in the measurement, and is more excellent in manufacture and cost than conventional ones. In addition, the load measurement apparatus 103 can obtain the derailment coefficient as well as the respective wheel loads of the wheels 11 and 12, can significantly reduce a time for a running test, and can evaluate the running safety more easily.

The load measurement apparatus 103 according to the present embodiment employs the configuration in which the axial load measurement units 120 and the radial load measurement units 130 are mounted to the left and right bearings of axle-boxes 21 and 22 respectively, as illustrated in FIG. 5. However, when the axial load values and the radial load values are found to be the same between the right and left wheels, the axial load measurement unit 120 and the radial load measurement unit 130 may be provided to either one of the right and left bearings of axle-boxes.

Fourth Embodiment

In the load measurement apparatuses 102 and 103, the configuration in which the axial load measurement unit 120 and the radial load measurement unit 130 are provided on the bearings of axle-boxes 21 and 22, and the axial force applied to the axle 13 is transmitted via a telemeter is used. However, the configuration of the load measurement apparatus is not limited thereto. A load measurement apparatus according a fourth embodiment shows one example of a modification of those configurations.

Figure 9:
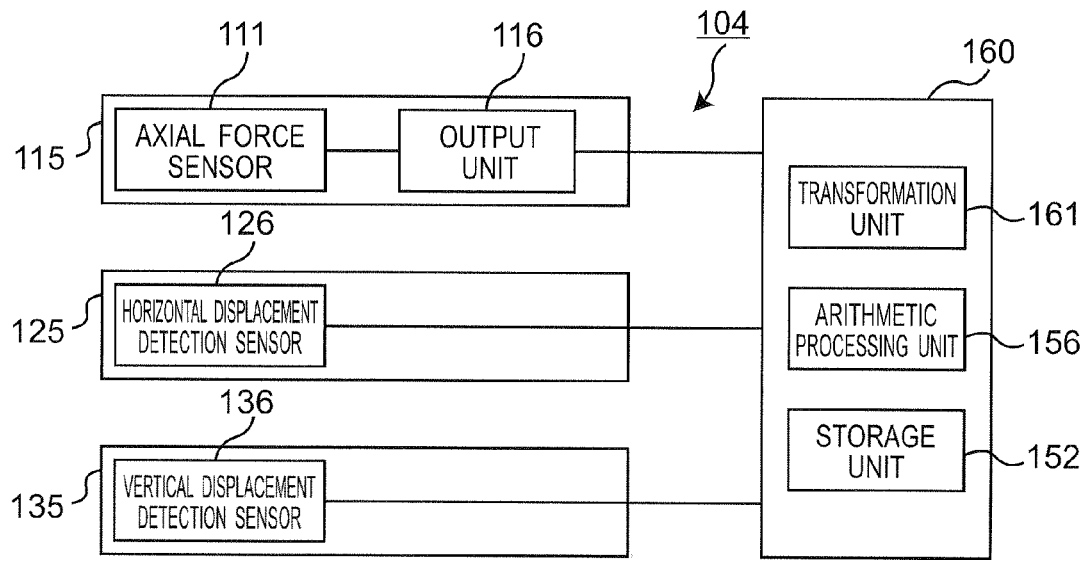
FIG. 9 is a block diagram illustrating a configuration of a load measurement apparatus according to a fourth embodiment.
Figure 10:
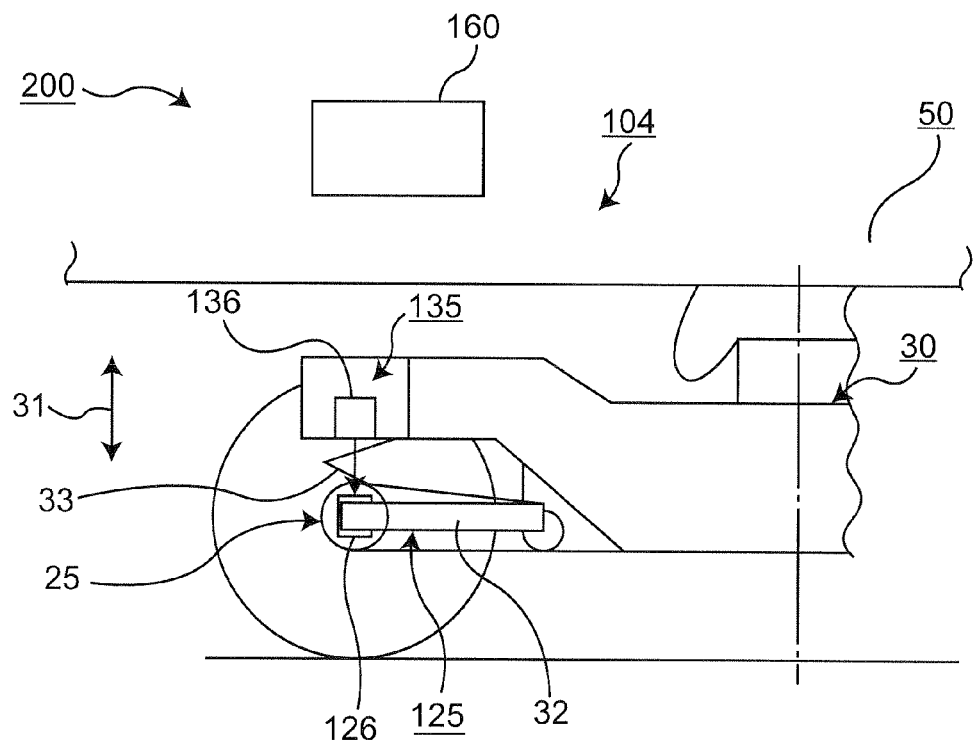
FIG. 10 is a side view of a car in which the load measurement apparatus according to the fourth embodiment is mounted to a truck.
Figure 11:
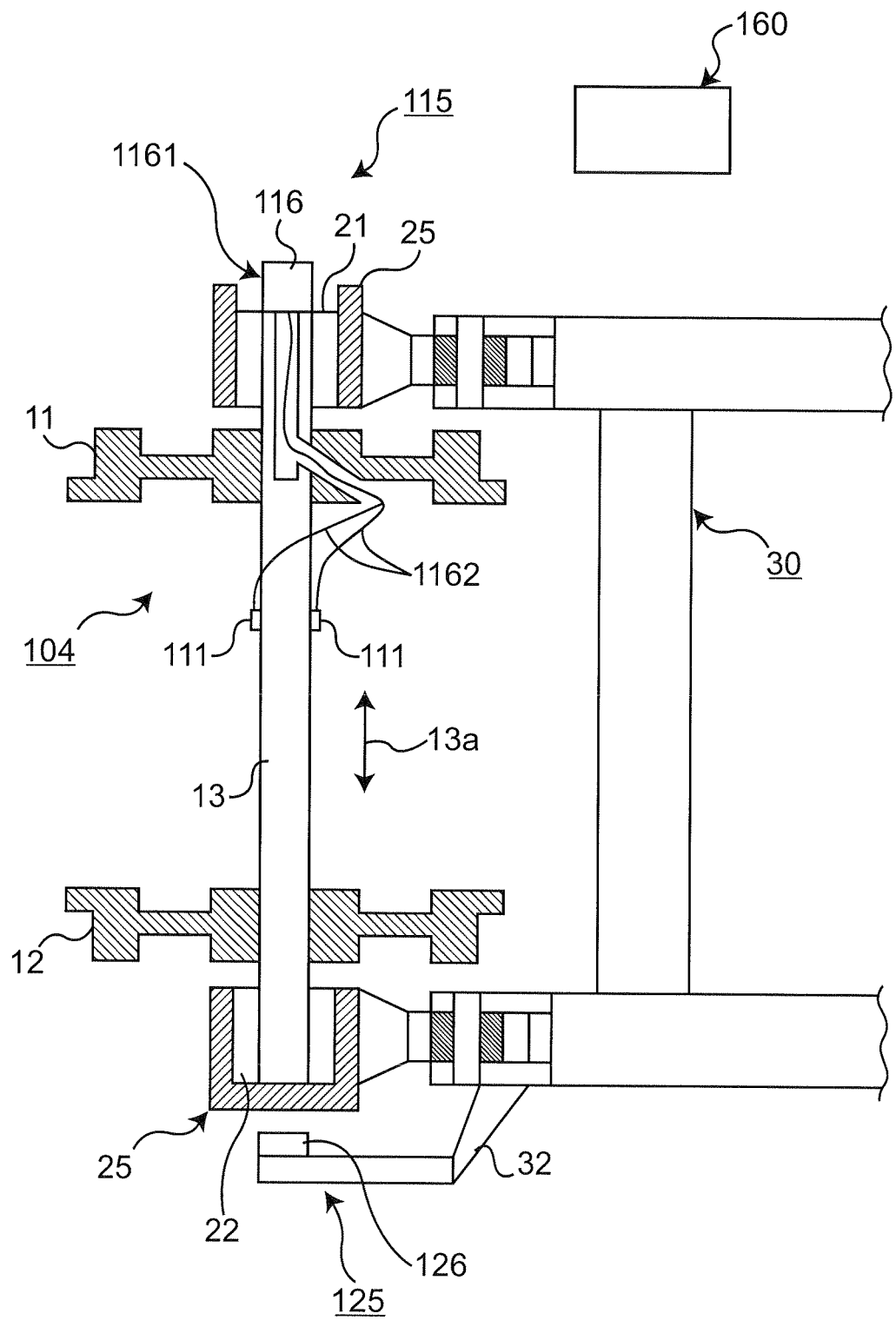
FIG. 11 is a plan view of the truck to which the load measurement apparatus according to the fourth embodiment is mounted.

Specifically, as illustrated in FIGS. 9 to 11, a load measurement apparatus 104 according to the fourth embodiment includes an axial force measurement unit 115, an axial load measurement unit 125, a radial load measurement unit 135, and a processor 160.

The axial force measurement unit 115 is an apparatus for measuring a force applied to the axle 13 in its longitudinal direction 13a, like the above axial force measurement unit 110, and includes the above axial force sensor 111 that is a strain gauge, for example, and an output unit 116. In the load measurement apparatus 104 according to the present embodiment, as illustrated in FIG. 11, a slip ring 1161 is used for the output unit 116, for example. The axial force sensor 111 and the slip ring 1161 are connected with a lead wire 1162 that is led to the slip ring 1161 through a lead wire hole formed in the wheel 11 and the axle 13. The output unit 116 is connected to the processor 160 mounted to a car body 50 (FIG. 10).

The axial load measurement unit 125 is an apparatus for measuring a displacement amount in the longitudinal direction 13a of, for example, each of the axle boxes 25 of the bearings of axle-boxes 21 and 22. The displacement amount corresponds to transformation information into the axial load. The axial load measurement unit 125 includes a horizontal displacement detection sensor 126. A proximity sensor can be used for the horizontal displacement detection sensor 126, for example. The horizontal displacement detection sensor 126 is mounted on the support member 32 fixed to a truck frame 30 so as to be opposite to the axle box 25. FIG. 11 illustrates that the axial load measurement unit 125 is provided only to one axle box 25. However, the axial load measurement unit 125 is generally provided to correspond to the axle boxes 25 at both sides in the longitudinal direction 13a. When the measured values at the left side and the right side are found to be the same, the axial load measurement unit 125 may be provided only to one side.

The axial load measurement unit 125 described above is connected to the processor 160 mounted to the car body 50.

The radial load measurement unit 135 is an apparatus for measuring a displacement amount in the vertical direction 31 of each of axle springs 33 of the axle boxes 25 of the bearings of axle-boxes 21 and 22 respectively. The displacement amount corresponds to transformation information to the radial load. The radial load measurement unit 135 includes a vertical displacement detection sensor 136. The vertical displacement detection sensor 136 obtains a vertical displacement of the axle spring 33 by measuring a relative vertical displacement between the truck frame 30 and the axle box 25. Various sensors can be used for the vertical displacement detection sensor 136. For example, a linear displacement sensor such as a magneto-striction type linear sensor that can measure in a non-contact manner, a differential transformer type linear sensor, or a magnetic linear scale may be used for the vertical displacement detection sensor 136. Alternatively, the vertical displacement of the axle spring 33 may be transformed into a rotational displacement of a shaft by using a lever mechanism, and then a rotational angle of a rotary encoder (resolver) may be detected, and the detected angle may be transformed into the vertical displacement amount. The vertical displacement detection sensors 136 are generally mounted to correspond to the axle springs 33 of the axle boxes 25 at both sides in the longitudinal direction 13a. When the measured values at the left side and the right side are found to be the same, the vertical displacement detection sensor 136 may be provided only to one side.

The radial load measurement unit 135 described above is connected to the processor 160 mounted to the car body 50.

The processor 160 is an apparatus for obtaining the respective lateral forces and the respective wheel loads applied to the rails from the left and right wheels 11 and 12 by using strain data which is supplied from the axial force measurement unit 115 and is applied to the axle 13, displacement amount data in the longitudinal direction 13a of the axle boxes 25 supplied from the axial load measurement unit 125, and displacement amount data in the vertical direction 31 of the axle springs 33 supplied from the radial load measurement unit 135. The processor 160 includes an arithmetic processing unit 156, a storage unit 152, and a transformation unit 161.

The transformation unit 161 transforms the displacement amount data in the longitudinal direction 13a into the axial loads, and transforms the displacement amount data in the vertical direction 31 into the radial loads. Specifically, the transformation unit 161 measures beforehand a relationship between the horizontal displacement amount of the axle box and axial load value, and stores the measured relationship in a form of a table. With this, the transformation unit 161 transforms the displacement amount data in the longitudinal direction 13a supplied from the axial load measurement unit 125 into the axial loads. Alternatively, the transformation unit 161 may have an arithmetic expression Fa1=g(y), wherein y is the horizontal displacement amount of the axle box, and g( ) is a function of horizontal characteristics of the axle box. The transformation unit 161 may calculate the axial loads by using this expression. The radial loads are similarly acquired. Specifically, the transformation unit 161 measures beforehand a relationship between the vertical displacement amount of the axle spring and radial load value, and stores the measured relationship in a form of a table. With this, the transformation unit 161 transforms the displacement amount data in the vertical direction 31 supplied from the radial load measurement unit 135 into the radial loads. Alternatively, the transformation unit 161 may have an arithmetic expression Fr1=f(z), wherein z is the vertical displacement amount of the axle spring and f( ) is a function of vertical characteristics of the axle box. The transformation unit 161 may calculate the radial loads by using this expression.

Similar to the processor 150, the processor 160 is implemented by using a computer as previously described. Therefore, the operation and function of the transformation unit 161 described above are executed by corresponding software.

Similar to the arithmetic processing unit 156 according to the third embodiment, more specifically the arithmetic processing unit 151 according to the second embodiment, the arithmetic processing unit 156 obtains the axial force of the axle 13 in the longitudinal direction 13a by using the strain data applied to the axle 13 and supplied from the axial force measurement unit 115. The arithmetic processing unit 156 also obtains the respective lateral forces (Q) and the respective wheel loads (P) applied to the rails from the left and right wheels 11 and 12 by using the axial loads and the radial loads, which are obtained through the transformation process by the transformation unit 161, as described above. The arithmetic processing unit 156 may also obtain the derailment coefficient (Q/P).

The storage unit 152 stores each lateral force value and each wheel load value obtained by the arithmetic processing unit 156, together with time information, track information, and traffic data. Therefore, each lateral force value and each wheel load value can always be stored not only upon the inspection but also the commercial running. The storage unit 152 may also store the derailment coefficient.

Similar to the load measurement apparatuses 102 and 103, the load measurement apparatus 104 thus configured can provide effects such that the load measurement apparatus 104 provides easy measurement, ensures reliability in the measurement, and is more excellent in manufacture and cost than conventional ones.

The configurations of the load measurement apparatuses 102 to 104 described in the second to fourth embodiments may be appropriately combined, and further the configuration of the conventional PQ wheelset may be appropriately combined to form a load measurement apparatus (for convenience of description, denoted with 109) having a novel configuration. In the combination with the conventional PQ wheelset, the configuration of the load measurement apparatus 102, for example, is used in order to obtain at least the lateral forces.

As an example of such combinations, a load measurement apparatus including a configuration below may be manufactured. Namely, the configuration is that, for example, the radial load is obtained by using the conversion of the vertical displacement amount of the axle spring described in the load measurement apparatus 104 according to the fourth embodiment, and the axial load is obtained by using the horizontal displacement detection sensor 121, which is included in the bearing and described as the load measurement apparatus 102 according to the second embodiment. Alternatively, a load measurement apparatus that measures the wheel loads with the measurement method using the conventional PQ wheelset, and obtains only the lateral forces by using the configuration of the second embodiment may be employed.

As stated in the above description, a railcar 200 (e.g., in FIG. 10) provided with any one of the load measurement apparatuses 102 to 104 according to the second to fourth embodiments, or the load measurement apparatus 109 can be configured. The railcar 200, having mounted thereto any one of the load measurement apparatuses 102 to 104, provides easy measurement, ensures reliability in the measurement, and can measure at least the lateral forces by using an usual commercial railcar, thereby being capable of significantly reducing the testing time and cost, compared to the conventional art.

At least one car in a train may be the railcar 200 provided with the load measurement apparatus.

Fifth Embodiment

Figure 12:
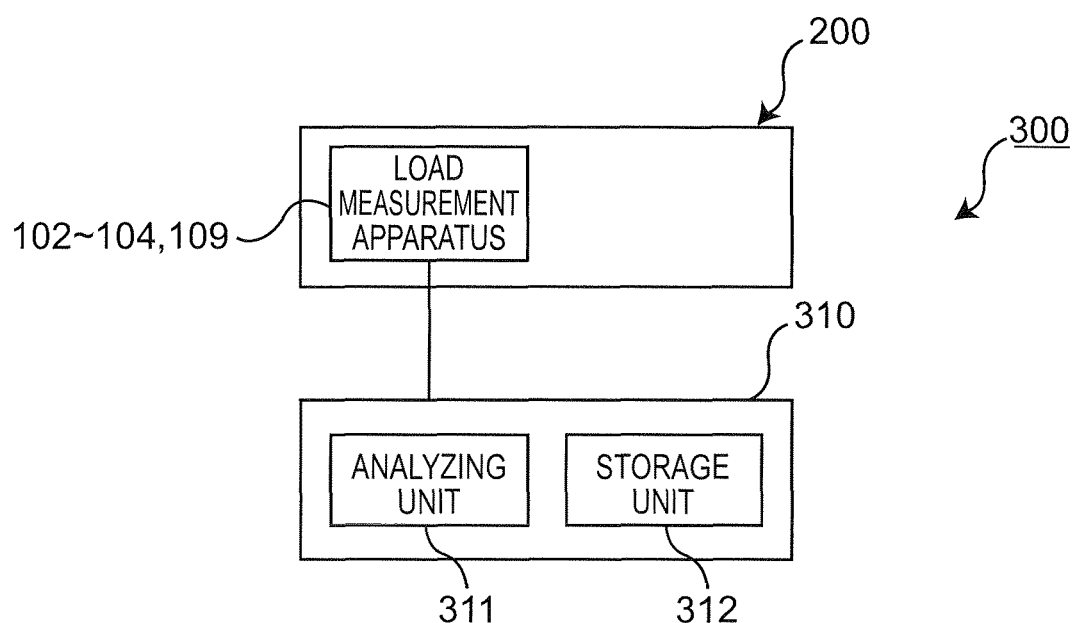
FIG. 12 is a block diagram illustrating a configuration of a load management system according to a fifth embodiment.

FIG. 12 is a block diagram illustrating a load management system 300 including the railcar 200 having one of the above load measurement apparatuses 102 to 104 and 109, and a processing apparatus 310. The load management system 300 manages a change of state in force applied between the wheel and rail over time. Here, the processing apparatus 310 includes an analyzing unit 311 and a storage unit 312. The storage unit 312 stores the lateral force values, the wheel load values, and the derailment coefficient. The storage unit 312 may also store the axial load values or the radial load values. Each of the above values is stored in association with such as time information, track information, and/or traffic data. The analyzing unit 311 obtains at least the lateral force values, and further the wheel load values and the derailment coefficient stored in the storage unit 152 in the load measurement apparatus 102, for example, together with the time information, and further such as the track information and the traffic data. Information transfer between the analyzing unit 311 and the storage unit 152 can be performed with wired communication or wireless communication.

The state of the force applied between the wheel and the rail changes with time after a new car is manufactured or when a new line is opened, due to a friction coefficient between them, a change in a state of a track, environmental factors such as temperature, and the like. Thus, even in commercial lines, safety in running a railcar can be ensured with a higher level by always or periodically inspecting at least the lateral force values.

In view of this, the analyzing unit 311 monitors over time at least a change of the lateral force value, and when the lateral force value exceeds a set value, the analyzing unit 311 outputs an abnormality signal indicating abnormality. Alternatively, the analyzing unit 311 notifies an instruction center or the like of the railway company of a need to repair at least one of a track and a railcar. The storage unit 312 stores the result of the analysis by the analyzing unit 311.

As described above, when including the load measurement apparatuses 102 to 104, the load management system 300 can contribute to at least ensuring safety described above by mounting a popular measuring equipment to a general railcar without using a special measurement wheelset such as the PQ wheelset. The load management system 300 can also provide a criterion as to whether a speedup can be performed or not within a section of an examination object, for example, by analyzing at least one of the lateral force values, the wheel load values, and the derailment coefficient in correlation with the track information.

Sixth Embodiment

Figure 13:
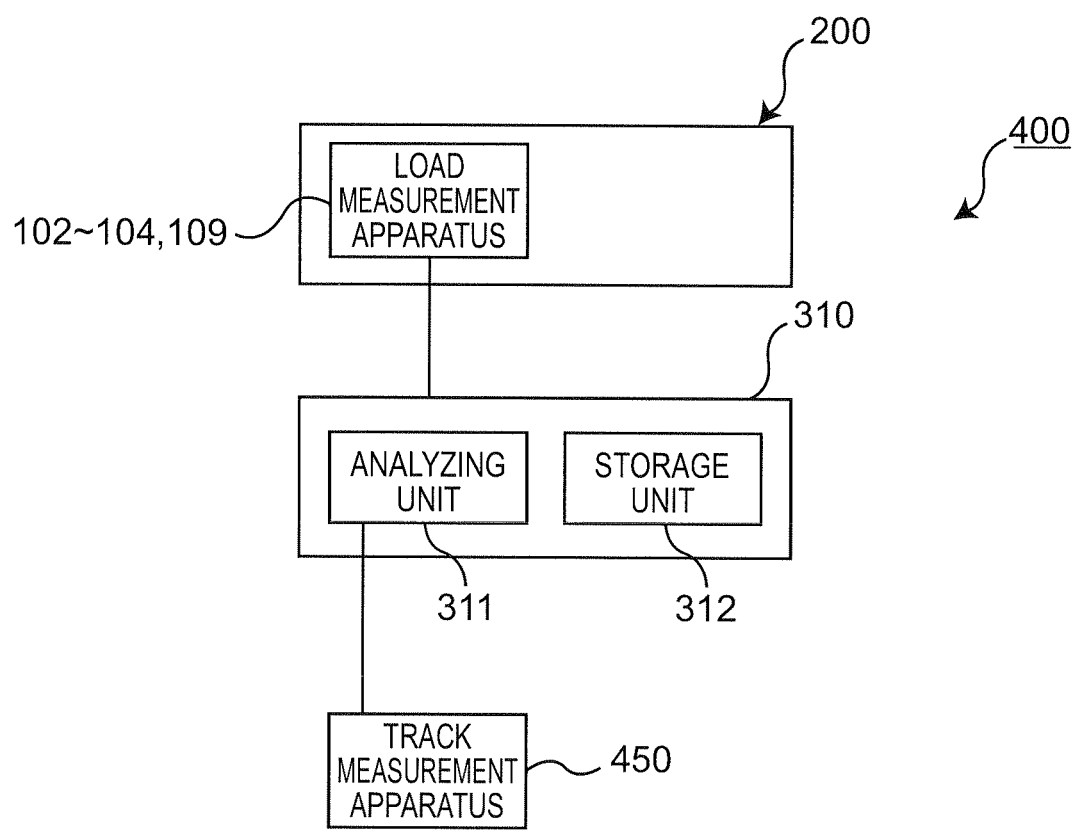
FIG. 13 is a block diagram illustrating a configuration of a railway management system according to a sixth embodiment.

FIG. 13 is a block diagram illustrating a railway management system 400 according to a sixth embodiment. The railway management system 400 has almost the same configuration as that of the load management system 300 in the fifth embodiment, but it differs in having a track measurement apparatus 450. The different point from the load management system 300 according to the fifth embodiment will mainly be described below.

The track measurement apparatus 450 is an apparatus, mounted on a measuring car, for measuring a position of an own car track on which the measuring car runs and a position of an adjacent track which is adjacent to the own car track by the measuring car to obtain an interval between the own car track and the adjacent track. Any known structures can be used for the track measurement apparatus 450.

When the lateral force values outputted from one of the load measurement apparatuses 102 to 104 and 109 in the railcar 200 exceed a predetermined set value, and the interval between the own car track and the adjacent track outputted from the track measurement apparatus 450 exceeds a predetermined set value, the analyzing unit 311 determines that the tracks have abnormality, and outputs a track abnormality signal. The analyzing unit 311 also obtains a speed by which a railcar can run safely in accordance with the track abnormality signal, and outputs an instruction signal to reduce speed to the railcar 200 and the following railcars.

On the other hand, when the lateral force values exceed the set value, but the interval between the tracks is equal to or lower than the set value, the analyzing unit 311 determines that the railcar has abnormality, and outputs a car abnormality signal. The analyzing unit 311 also determines whether the railcar can continue running or not in accordance with the car abnormality signal. When the railcar can continue running, the analyzing unit 311 outputs an instruction to reduce the speed to a speed by which the railcar can safely run. When the railcar cannot continue running, the analyzing unit 311 outputs an instruction to stop. The detection signals, the instructions to reduce a speed, or the notification of repair may be reported to the instruction center or the like of the railway company.

Since the railway management system 400 further includes the track measurement apparatus 450, it can ensure high safety, and disruption to the train service can be reduced. The railway management system 400 can also quickly determine which one of the track and the railcar has to be repaired.

When any of the various embodiments described above are appropriately combined, the effects of these embodiments can be provided.

Although the present invention has fully been described in relation to the preferable embodiments with reference to the accompanying drawings, it is to be noted that various changes and modifications are apparent to those skilled in the art. Such changes and modifications are to be understood as included within the scope of the present invention as defined by the appended claims unless they depart therefrom.

The entire contents of the specification, drawings, claims, and abstract of Japanese Patent Application No. 2012-199724, filed on Sep. 11, 2012, are incorporated herein by reference.

INDUSTRIAL APPLICABILITY

The present invention is applicable to a load measurement method and apparatus for measuring a force applied between a wheel of a railcar and a rail, a railcar provided with the load measurement apparatus, and a load management system provided with the railcar.

DESCRIPTION OF REFERENCE SIGNS

13: Axle
102-104: Load measurement apparatus

110: Axial force measurement unit
120: Axial load measurement unit
121: Horizontal displacement detection sensor
126: Horizontal displacement detection sensor
130: Radial load measurement unit
131: Radial load sensor
136: Vertical displacement detection sensor
150: Processor
160: Processor
161: Transformation unit
200: Railcar
300: Load management system

The invention claimed is:

1. A load measurement method for measuring loads applied to rails from a pair of wheels of a railcar which includes the wheels, an axle supporting the wheels, a pair of bearings supporting the axle to be rotatable, and an axle box housing the bearings, the method comprising:
  detecting, by a horizontal displacement detection sensor, a displacement of the axle in the longitudinal direction at the axle box or a displacement of the axle box in the longitudinal direction with respect to a truck frame;
  transforming, by a processor, each of values detected by the horizontal displacement detection sensor into respective axial loads;
  measuring an axial force applied to the axle in a longitudinal direction; and
  obtaining, by the processor, lateral forces applied to rails from the respective wheels by using the respective axial loads and the measured axial force.

2. The load measurement method according to claim 1, wherein each of the lateral forces is obtained from expressions (1) and (2) below:

$$Fq1 = Fa3 - Fa1 \quad (1)$$

$$Fq2 = Fa3 - Fa2 \quad (2)$$

wherein Fq1 is a lateral force of one wheel, Fq2 is a lateral force of the other wheel, Fa1 is an axial load applied to one bearing, Fa2 is an axial load applied to the other bearing, and Fa3 is the axial force.

3. A load measurement apparatus for measuring loads applied to rails from a pair of wheels of a railcar which includes the wheels, an axle supporting the wheels, a pair of bearings supporting the axle to be rotatable, and an axle box housing the bearings, the apparatus comprising:
  an axial load measurement unit including a horizontal displacement detection sensor configured to detect a displacement of the axle in the longitudinal direction at the axle box or a displacement of the axle box in the longitudinal direction with respect to a truck frame;
  an axial force measurement unit configured to measure an axial force applied to the axle in a longitudinal direction; and
  a processor configured to:
    transform each of values detected by the horizontal displacement detection sensor into respective axial loads; and
    obtain each of lateral forces applied to the rails from the wheels by using the respective axial loads and the axial force.

4. The load measurement apparatus according to claim 3, wherein the axial force measurement unit includes a strain gauge mounted on the axle between the right and left wheels for measuring the axial force.

5. The load measurement apparatus according to claim 3, further comprising:
  a radial load measurement unit mounted to a truck frame or each of the bearings and configured to measure a radial load applied to each of the bearings,
  wherein the processor obtains each of wheel loads applied to the rail from each of the wheels based on the measured radial load.

6. The load measurement apparatus according to claim 5, the railcar further including an axle spring mounted between the axle box and a truck frame,
  wherein the radial load measurement unit has a vertical displacement detection sensor configured to detect a vertical displacement of the axle spring, and
  the processor is configured to transform each of values detected by the vertical displacement detection sensor into the respective wheel loads.

7. A railcar comprising the load measurement apparatus according to claim 3.

8. A load management system configured to manage loads applied to rails from a pair of wheels of a railcar including the wheels, an axle supporting the wheels, a pair of bearings supporting the axle to be rotatable, and an axle box housing the bearings, the system comprising:
  an axial load measurement unit including a horizontal displacement detection sensor configured to detect a displacement of the axle in the longitudinal direction at the axle box or a displacement of the axle box in the longitudinal direction with respect to a truck frame;
  an axial force measurement unit configured to measure an axial force applied to the axle in a longitudinal direction;
  a first processor configured to:
    transform each of values detected by the horizontal displacement detection sensor into respective axial loads; and
    obtain each of lateral forces applied to the rails from the wheels by using the respective axial loads and the axial force; and
  a storage unit configured to store lateral force information indicating the lateral forces obtained by the first processor, and at least one of time information, track information and traffic data, which correspond to the obtained lateral force;
  an analyzing unit configured to obtain a change over time of the lateral force information based on each of the information pieces stored in the storage unit; and
  a second processor configured to implement the functions performed by the analyzing unit.

9. The load management system according to claim 8, further comprising:
  a radial load measurement unit mounted to a truck frame or the bearing and configured to measure a radial load applied to the bearing,
  wherein the first processor is configured to obtain each of wheel loads applied to the rails from the wheels based on the measured radial load,
  the storage unit is configured to store wheel load information indicating the wheel load obtained by the first processor, and at least one of time information, track information and traffic data, which correspond to the obtained wheel load, and
  the analyzing unit is configured to obtain a change over time of the wheel load information based on each of the information pieces stored in the storage unit.

* * * * *